United States Patent Office 3,611,662
Patented Oct. 12, 1971

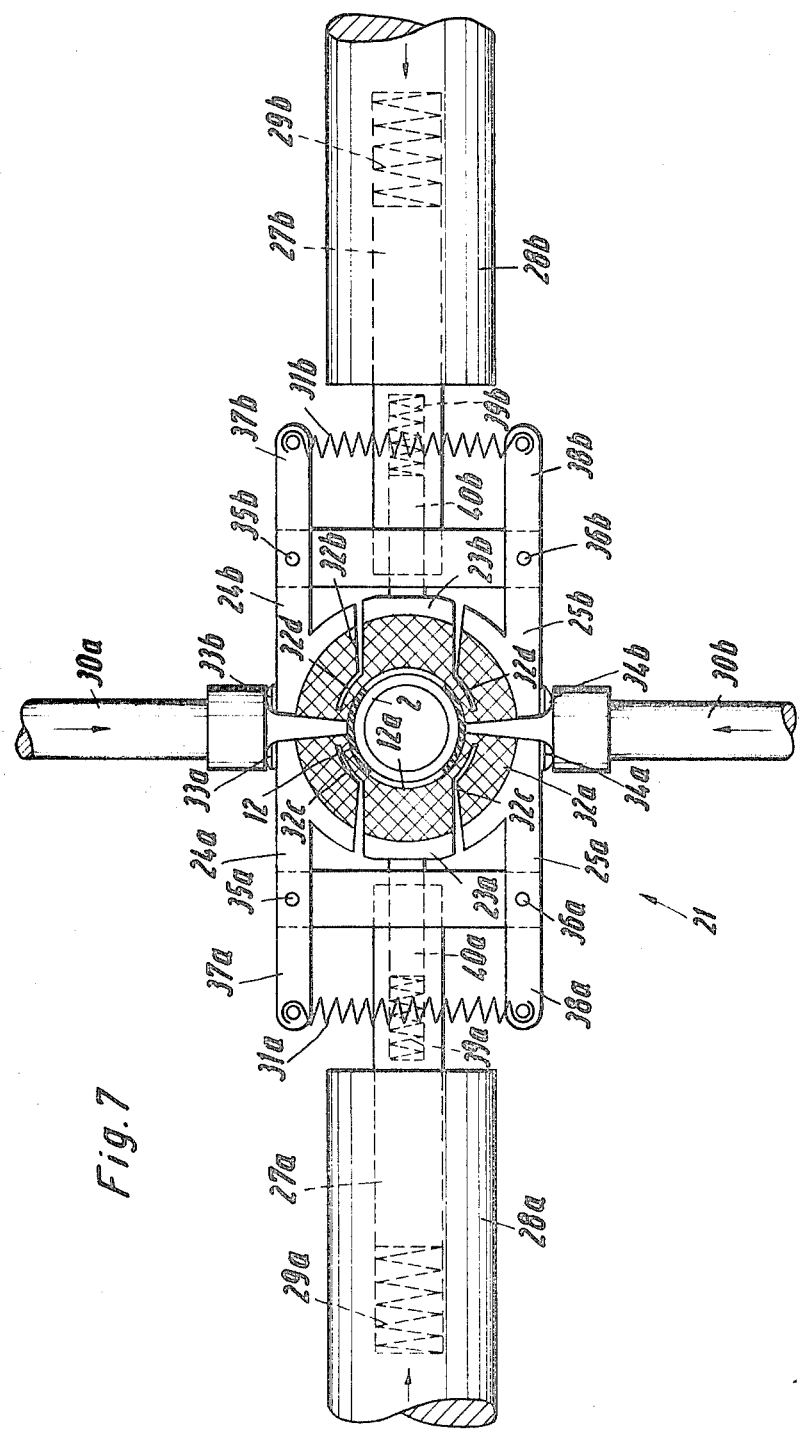

3,611,662
METHOD AND APPARATUS FOR SEALING BOTTLES
Johann Heinrich Friedrich Schmitt, Nierstein (Rhine), Germany, assignor to Vereinigte Kapselfabriken Nackenheim GmbH, Nackenheim am Rhine, Germany
Filed Apr. 1, 1969, Ser. No. 812,066
Claims priority, application Germany, Mar. 12, 1969, P 19 12 458.4
Int. Cl. B67b *3/16, 5/00*
U.S. Cl. 53—14
13 Claims

ABSTRACT OF THE DISCLOSURE

Method and apparatus for the application and fastening of prefabricated seals or crowns on champagne bottles in which the filled, corked and wired bottle is fed on a conveyor belt and glue is applied to a narrow area below the mouth of the bottle, the bottle is rotated axially in relation to the conveyor belt to position the bottle in a preferred location with respect to the seal, means are provided to grip the bottle firmly and non-rotatably and to convey the bottle to an apparatus where a seal is placed loosely on the bottle, means are then provided to scan the bottle to check whether or not the seal has been applied and the seal is then lifted and aligned relative to the subsequent tools for folding, pre-folding and finally finish-folding the seal by pressing against the bottle neck.

The invention relates to a method and apparatus for the application and fastening of prefabricated seals or crowns on champagne bottles fed on a conveyor belt in a continuous operation.

A prior machine for sealing champagne bottles comprises primarily a merry-go-round having, as individual devices, rotary bottle carriers, means for folding the seals on the bottleneck and rotating, lifting and photoelectric-cell-controlled switching means (German Petty Pat. No. 1,969,939). With the aid of the machines of prior art the following method can be embodied for sealing champagne bottles. The bottles to be sealed, upon which the seals, as a rule, are placed manually, move toward the merry-go-round on a conveyor belt. A pre-sorting worm gear operating at the entrance into the merry-go-round parallel with the conveyor belt sees to it that the bottles enter the merry-go-round individually and at a predetermined reciprocal distance. In the merry-go-round, each bottle is lifted upon a bottle carrier which, in a first operation, is rotated until a color mark on the seal is placed into the scanning light ray of a photoelectric cell, which disconnects the rotary drive of the bottle carrier. As a result, the creases or folds pressed into the seal in the subsequent operation and pressed against the jacket of the seal will not cover the legend on the jacket of the seal. Folding heads which simultaneously impress the folds into the jacket of the seal and apply them against the jacket are used as folding means.

Particularly high requirements must be met by capsules on bottles for discriminating brands of champagne. In order to achieve an impeccable promotional effect, the folding operation shall be executable in such a manner that the area of advertising of the jacket of the capsule is perfectly smooth after the formation of the folds. The seal shall be so oriented relative to the bottleneck that the loop of the wiring for the cork is placed at a window in the jacket.

Moreover, care shall be taken that even after the bottle has been opened, the jacket of the seal still is placed impeccably on the bottleneck, so that the promotional effect still is maintained even after the bottle has been opened.

These requirements can be met by the machine of prior art for sealing bottles only incompletely to some extent and not at all in other respects. The folding heads used in the machine of prior art do an imperfect job. It has been discovered that it is impossible to achieve with them in one single operation perfectly smooth seal jackets. The other requirements, alignment of the seal relative to the bottleneck and impeccable fit of the seal jacket even on the opened bottle, cannot be met by the machines of prior art because they lack the corresponding devices. That is why until now manual labor still had to be used in the sealing of champagne bottles where the seals must meet high requirements.

It is an object of this invention to provide a method and apparatus by which it is possible to eliminate the complicated and costly manual labor.

The problem of the invention directed to the method is solved in that the filled, corked and wired bottle is provided, in a small area below the mouth of the bottle, with an application of glue, then the bottle is rotated axially in relation to the conveyor belt, in order to place it into a preferred position in relation to the seal, then the bottle is seized firmly and non-rotatably, and conveyed to an apparatus where a seal is placed loosely on the bottle, whereupon a check is made by scanning whether a seal was applied, said seal then being lifted and aligned relative to the subsequent folding tools, whereupon by being pressed against the bottleneck the seal is first prefolded and finally finish-folded.

The method according to the invention comprises, in automatically performed operations, all steps needed in order to so apply and fasten the seals to champagne bottles that, before and after the opening of the bottle, a satisfactory advertising effect is possible on the seal jacket. The capsules or seals are thereby so placed on the bottleneck that the loop of the wiring for the cork is placed at a window in the seal jacket.

An embodiment of the method of the invention provides an arrangement of individual pieces of apparatus, namely an apparatus located in the area of a pre-sorting worm gear for rotating the bottle and for the application of adhesive on the upper bottleneck, fastening means for the bottles arranged subsequently to the pre-sorting worm gear along the conveyor belt, and installations connected in series in the area of the fastening means for the photo-electric-cell-controlled alignment of the bottles, for placing the seals, for scanning the seals with a disconnect mechanism of part of the machine, for the photoelectric-cell-controlled alignment of the seals relative to the bottles, for pre-folding the seals on the bottleneck and for the finish-folding of the seals.

In an advantageous improvement of the invention, the apparatus for rotating the bottles, located in the area of the pre-sorting worm gear, is a belt equipped, parallel to the worm gear level with the foot of the bottle, with a friction coat, said friction coat being pressed against the foot of the bottle for rotating the bottles. The apparatus for applying the adhesive to the upper bottleneck consists, according to the invention, of a belt to which adhesive adheres.

The simple embodiment of the devices operating at the pre-sorting worm gear for producing the layer of glue on the bottleneck requires little space and operates dependably. Thanks to the layer of glue applied to the bottleneck in the area of the mouth of the bottle it is accomplished that, as the head of the seal is separated from the bottle, the seal jacket will not be damaged. Without the layer of glue, according to the invention, the seal jacket is more or less torn off as the bottle is opened, so that it loses its promotional effect and dangles loosely at the bottleneck.

The production of a layer of glue on the bottleneck for fastening the seal jacket to the bottle was not realized in sealing machines of the prior art, although the champagne bottles had recognized a long time ago the advantage of seals fixedly connected to the bottleneck by an adhesive means. Within the scope of the present invention, a practical solution for a gluing apparatus was offered for the first time. It has moreover been recognized that a gluing apparatus also requires an additional apparatus which protects the tools of the folding apparatus against the layer of glue, if the apparatus for placing the seals located between the gluing and folding apparatus should fail, so that no seal is applied to the bottleneck.

In order to protect the folding tools, the invention discloses an apparatus for the scanning of the seals which is connected to a switch means which, in case of the absence of a seal, will disconnect the subsequent aligning and seal-folding operations.

The invention, however, discloses an additional variant of the method and an apparatus for completely preventing contamination of the subsequent seal-folding tools by glue applied even if no seal was applied and if there is no separate control station which would cause the conveyor belt to stop. This stopping of the conveyor belt may be undesirable if the machine for the placing of the seals is synchronized with other machines preceding or succeeding it in the sequence of operations, for example filling, closing or labeling machines.

This additional problem is solved, according to the invention, in that the glue is applied on the inside of the seal readied for being placed on the bottle. No more glue is now applied to the bottle, so that, even when no seal is applied, the subsequent folding tools are protected against contamination.

Further, according to the invention, the glue is applied by spraying an annular strip of glue to the inner jacket area of the readied seal. In this way, the quantity of glue required for the gluing can be applied in the proper dose at the spot needed for the gluing, namely, an annular area inside the seal, without any mechanical contact between the glue-sizing tool and the seal.

The advantageous apparatus for the embodiment of the method according to the invention is characterized, in accordance with the invention, by cylindrical bushings rotatable around vertical shafts and intended for accommodating the seal, said bushings being arranged above the bottle conveyor belt in a switching plate provided with a vertical rotary shaft. The bushings in the rotary plate accommodate one seal at a time, allow for free accessibility to the inner area of the seal for the gluesizing tools, ready the seals and guide them into the position above the bottle head, from where the seals are thrown upon the bottles. It has furthermore been discovered that it is advantageous to provide, at the lower end of the bushings, seal holders pivotable into the perforation for the accommodation of the seals, which, when the bushing is above the bottle, can be pivoted outwardly to release the seal. Consequently, the seal can at first be thrown freely into the perforation of the bushing, wherein it is held firmly by the seal holders at the lower edge; in the position intended for the throwing upon the bottleneck, the seal holders can be pivoted outwardly so that the seals drop on the bottles. A mechanical gripping of the thin-walled and relatively easily deformable seals is superfluous.

An additional advantageous embodiment of the idea of the invention is characterized by a glue spraying tube insertable from the bottom into the seal accommodated by the bushing, said tube being provided with a laterally placed nozzle. Thereby the glue spraying tube is inserted in the switching position provided therefor in the switching plate, from the bottom into the seal accommodated in the bushing; the glue is sprayed through the laterally arranged nozzle upon the inner surface of the seal without requiring any mechanical contact between the gluesizing tool and the seal. It is expedient to propel the bushings during the application of glue mechanically, for example, by means of a friction drive. This offers the additional advantage that the spraying of the glue needs to take place only toward one single direction; as a result of the rotation of the propellable bushing the glue is distributed evenly over an annular surface inside the bushing. The friction drive offers the advantage that it can easily be engaged and disengaged with reference to the bushing, in that during the switching movement of the switching plate the bushing comes in contact with the friction drive.

An advantageous embodiment of the invention also can be obtained in that the switching plate is moved by 90° in each case synchronously with the bottle conveyor chain, and that it comprises eight bushings for the accommodation of the seals, two of which remain in throw-off position above two bottles, while the two opposite propelled bushings are provided with the coat of glue on the inside. The drive of the bushings in the glue-sizing station is expediently accomplished by means of a friction belt drive jointly contacting the bushings to be propelled. Such a drive has the advantage, among others, that it allows to drive simultaneously a plurality, for example two of these bushings, and that it is easy to engage and disengage the bushings with regard to this friction belt drive, because the belt is relatively resilient transversely to its direction of movement.

The application of the glue, according to the invention, on the inside of the seal also offers an additional special advantage, namely that the creases produced during the subsequent folding operation of the bushing adhere with their inner surfaces, so that they are much better solidified than what would be the case without this internal gluesizing.

The machine for sealing champagne bottles, according to the present invention, advantageously differs from sealing machines of prior art because it is provided with an apparatus by which the seal can be rotated prior to the folding operation relative to the bottleneck until the wire loop of the cork wiring appears at a window applied in the seal. The alignment means for the seal is a gripper, according to the invention, which lifts the seal and rotates it whereby the rotary movement is controllable via a photoelectric cell for a definite alignment of the seal.

In the machine according to the invention, the problem of the sealing of bottles with the formation of folds or creases of satisfactory appearance, not harming the captions or coats of arm could be solved for the first time on the seal jacket by using separate pre-folding and finishfolding machines.

According to the invention, the apparatus for prefolding the seals consists of two identical pairs of dies lined with elastic material.

The apparatus for the finish-folding of the seals consists of a pair of narrow press-on jaws and two pairs of wide fold-application jaws, a rubber ring of two parts being placed between the jaws of the pairs and the seal, and the press-on jaws being connected on one side with one pressure lever each, the press-on jaws being located in the area of two press-on means and springs being provided to attenuate the movements executable by the jaws.

For the execution of the two folding operations separated from each other, the invention finally provides one head die each to hold down the seals in coaction with the pre-fold and finish-fold tools.

These and other objects and advantages of this invention will hereinafter appear, and for purposes of illustration, but not of limitation, embodiments of the invention are shown in the accompanying drawings, in which:

FIG. 7 shows in a schematic view from the top with partial presentation in section an embodiment of the apparatus for the finish-folding of the seal;

Figure 1:
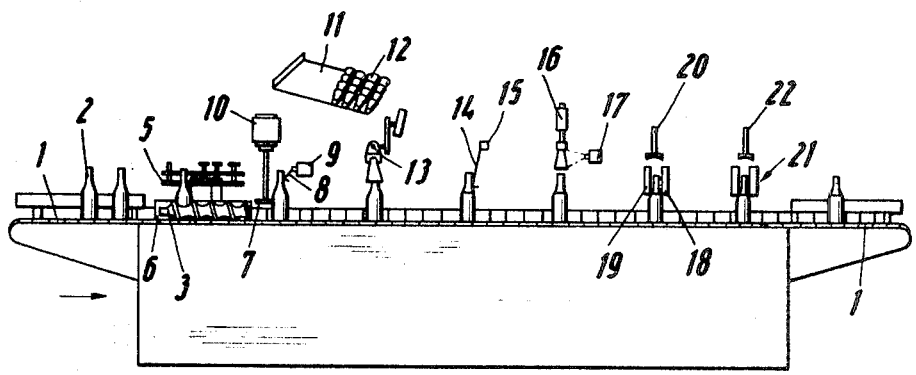
FIG. 1 shows a schematic lateral view of an embodiment of a machine according to the present invention.
Figure 2:
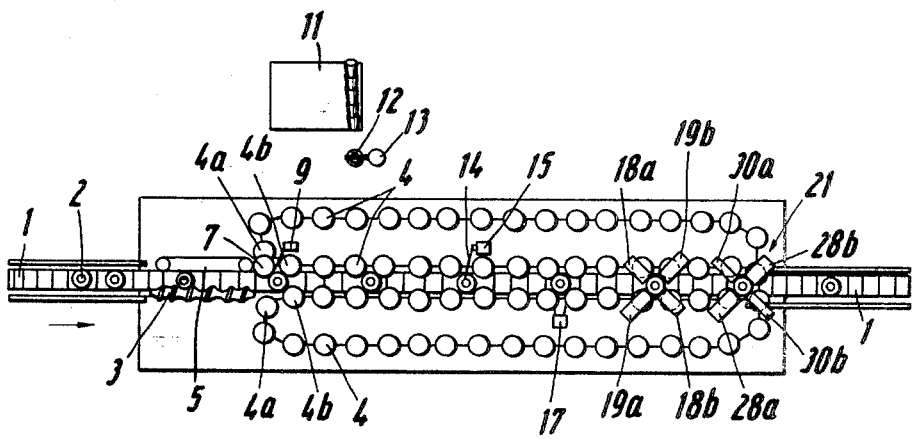
FIG. 2 shows a plan view upon the embodiment according to FIG. 1.
Figure 3:
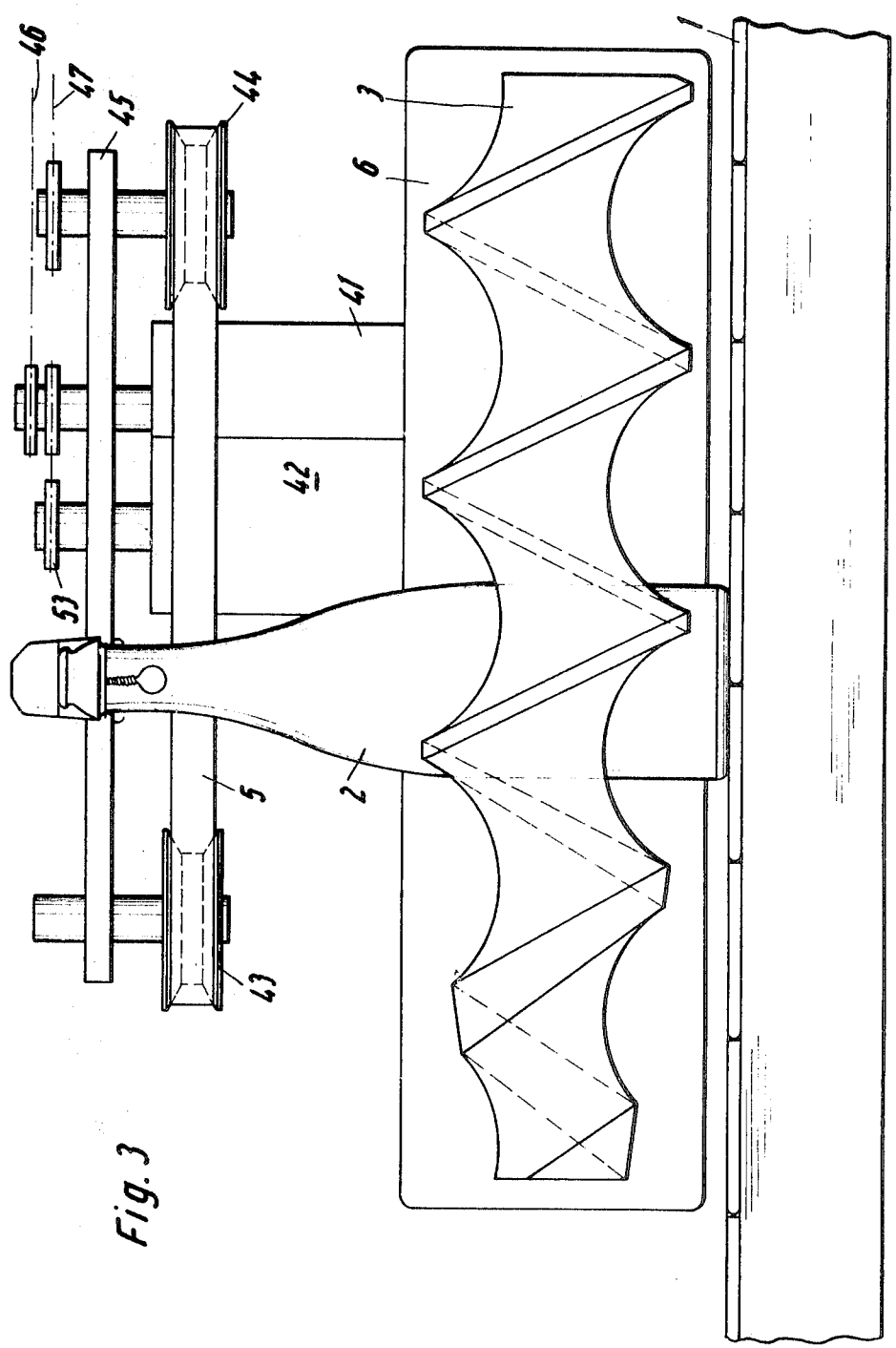
FIG. 3 shows details on an enlarged scale of a gluing apparatus shown on a reduced scale in FIGS. 1 and 2.

Champagne bottles 2 already filled, corked and wired are fed on a conveyor belt 1 moving in FIGS. 1 and 2 in the direction of the horizontal arrow from right to left to the sealing machine. A pre-sorter worm gear 3 seizes the bottles 2 which continue to rest on the conveyor belt 1 and places them at equal reciprocal distances. The conveyor belt is propelled by means of an electric motor (not shown) which is controlled by a (likewise not shown) remote control installation. A gear with several phases of speeds is provided in the drive of the conveyor belt. A first operating station of the sealing machine is located in the area of the pre-sorter worm gear. It consists of two parts which together form a glue-sizing apparatus. A belt 6 is provided with a friction coat facing the bottles. So that the bottles can be put into a rotary movement, each bottle foot adheres at one side to the worm gear and is in frictional connection on the opposite side with the friction belt, A V-belt 5 continuously driven by a drive motor via rollers 44 is in contact with its wide surface on the one hand with the bottleneck and on the other hand with rollers 31, 42, which immerse with their lower ends into a glue supply tank (not shown). The surfaces of the rollers are provided with a felt coat or some other appropriate porous coat. The glue is urged upward between the contacting surfaces of the rollers which rotate in opposite directions, under the cooperation of capillary forces, and reaches the range of the wide surface of the belt 5. One roller 44 is propelled by belt 47 and one roller 41 is propelled by belt 46. A cross belt 53 connects the drive pulleys of both rollers. The bearings for the rollers 43, 44 and/or the rollers 41, 42 are located in a flat iron 45.

Subsequent to the pre-sorter worm gear 3 the bottles 2 enter the area of two roller chains 4 with vertically placed roller shafts. The roller chains 4 which move the bottles 2 cyclically from one operating station to the next one are propelled via chain wheels and Maltese cross transmissions (not shown for reasons of simplification). The rollers of the chains 4 are positioned bilaterally and turn with ball bearings in U-shaped rails. The pre-sorter worm gear 3 is also propelled by the Maltese cross transmission, so that the worm gear 3 and the chains 4 are moved synchronously and rhythmically. once each bottle 2 originating from the pre-sorter worm gear 3 already has adhered against the rollers 4b of both roller chains 4, while the rollers 4a have not yet come in contact with the bottle 2, the bottle 2 is in frictional connection with a friction wheel 7 provided with a drive motor 10. With the aid of the friction wheel 7 each bottle 2 can be aligned by rotation. The rotation is controlled with a scanner 2 which via a switch 9 stops the rotary movement when the scanner comes in contact with the bottle seam for example. In other words, the bottle placed ahead of the roller chain 4 is rotated by the friction wheel 7, until a control mark, for example also the bottle seam appropriate as a control mark, is seized by the scanner 8. Then the switch 9 operates an electro-magnetic brake coupling located between motor 10 and friction wheel 9, whereby the rotary movement is stopped precisely in the position desired.

The roller chains 4 execute rhythmical movements by which the bottles are held firmly for a certain time in the six cyclical positions shown in FIGS. 1 and 2, the conveyor belt 1 continuing to move beneath the bottles 2. The first cyclical point is at the above described friction wheel 7, at which each bottle still is rotatable. When the first cyclical point has been passed, two rollers each of each roller chain 4, that is a total of four rollers, adhere against each bottle 2, hold the bottle 2 so firmly that no rotation of the bottle is possible as far as the end of the roller chains 4.

A seal application apparatus with a seal magazine 11 and seals 12 is placed above the second cyclical point. A conveyor gripper 13 seizes one capsule or seal in each case, moves it to the bottle and deposits it above the bottle mouth. A seal application apparatus is shown schematically in FIGS. 1 and 2.

Figure 4:
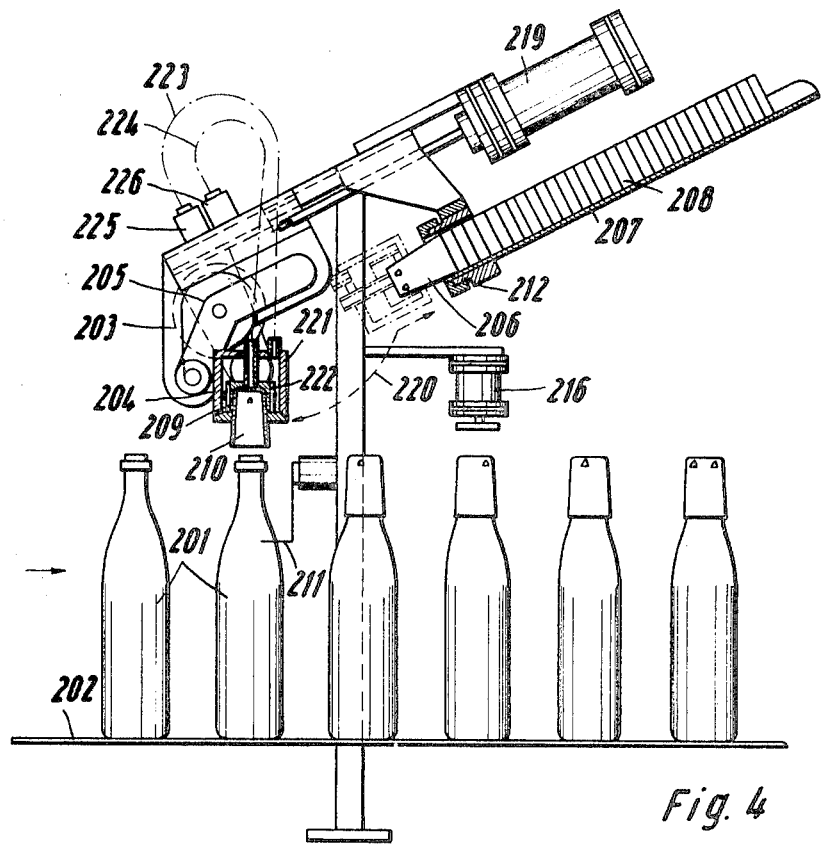
FIG. 4 shows an apparatus for the application of the seal as shown schematically in FIGS. 1 and 2, on an enlarged scale.

FIG. 4 shows in an enlarged scale the details of a seal application apparatus usable in a machine according to FIGS. 1 and 2. Substantially the apparatus is provided with a conveying cup 204 and an inclined seal supply groove 207. The conveying cup 204 is displaceable a sliding guide 205 and pivotable, by means of a cylinder-piston arrangement 219 not shown in detail, in order to seize the foremost seal 206 on the seal bar 208 located on the groove 207 and to deliver it at point 210 immediately above a bottle 201 located on the conveyor belt 202. The orbit of the conveyor cup 204 is shown by the arrow 220. The conveyor cup 204 is provided with a housing 221 and a gripper head 222 located in the housing and adapted to the shape of the seal; it is provided in its jacket with an annular slot and embraced by a flexible diaphragm 209 overlapping the slot. The housing 221 and the bottom of the gripper head 222 are connected via flexible conduits 23, 24 to compressed air connections 225, 226. The supply of compressed air is controlled by means of a switch 111 operated by the bottles 201.

A holder ring 212 located at the lower end of the groove 207 embraces the seal bar 208 and yieldingly adheres against the marginal seal portion of the seal foremost in each case (106).

The apparatus operates in such a manner that the conveyor cup 204 is pivoted by means of the piston-cylinder arrangement 219 in front of the lower end of the seal bar 208 located in the groove 207 and held firmly by the holding ring 212, whereby the gripper head 222 embraces the head portion of the foremost seal protruding from the holding ring. Compressed air is then introduced via conduit 223 into the housing 221 of the conveyor cup 204, which presses parts of the flexible diaphragm 209 through the annular slot of the gripper head, so that the foremost seal 206 is seized by the bar 208. The conveyor cup 204 is then pivoted along the sliding guide 205 above one of the bottles 201 placed on the conveyor belt 202. In the initial portion of this movement the seal 206 is removed from the seal bar against the holding resistance of the holding ring 212. The holding ring 212 then seizes the seal immediately following in the bar.

The bottle 201 arriving below the conveyor cup 204 at point 210 operates the switch 211, whereby the diaphragm 209 of the cup 204 is relieved and releases the seal. A short blast of air which is blown via conduit 224 into the gripper head 222 and hits the bottom of the seal, enhances the application of the seal on the bottleneck. The control of the piston-cylinder arrangement is likewise accomplished by the switch 111.

At the third cycle point the activity of the seal application apparatus is examined. This inspection is important in this embodiment of the machine, because in case a seal is missing the folding tools operating at the last cycle points would be contaminated with adhesive due to the glue coating at the upper bottleneck. A glue coating on the folding tools would cause the jaws of the folding tools to entrain the seal jacket and the creases during the reverse movement. This would considerably curtail or even render impossible the manner of operation of the folding tools. The inspection apparatus consists of a scanner 14 and a switch 15. The scanner checks by mechanical scanning whether the seal application apparatus has placed a seal on the bottle. If the scanner detects a seal, the machine continues to operate undisturbed. If the scanner detects, however, that no seal is on the bottle the switch coupled with the scanner disconnects the subsequent operation for the bottles without seal. The inspection apparatus also may operate in such a manner that in case of a performance failure of the seal application apparatus the entire machine is disconnected, thus offering an opportunity to replace the missing seal by hand.

Figure 5:
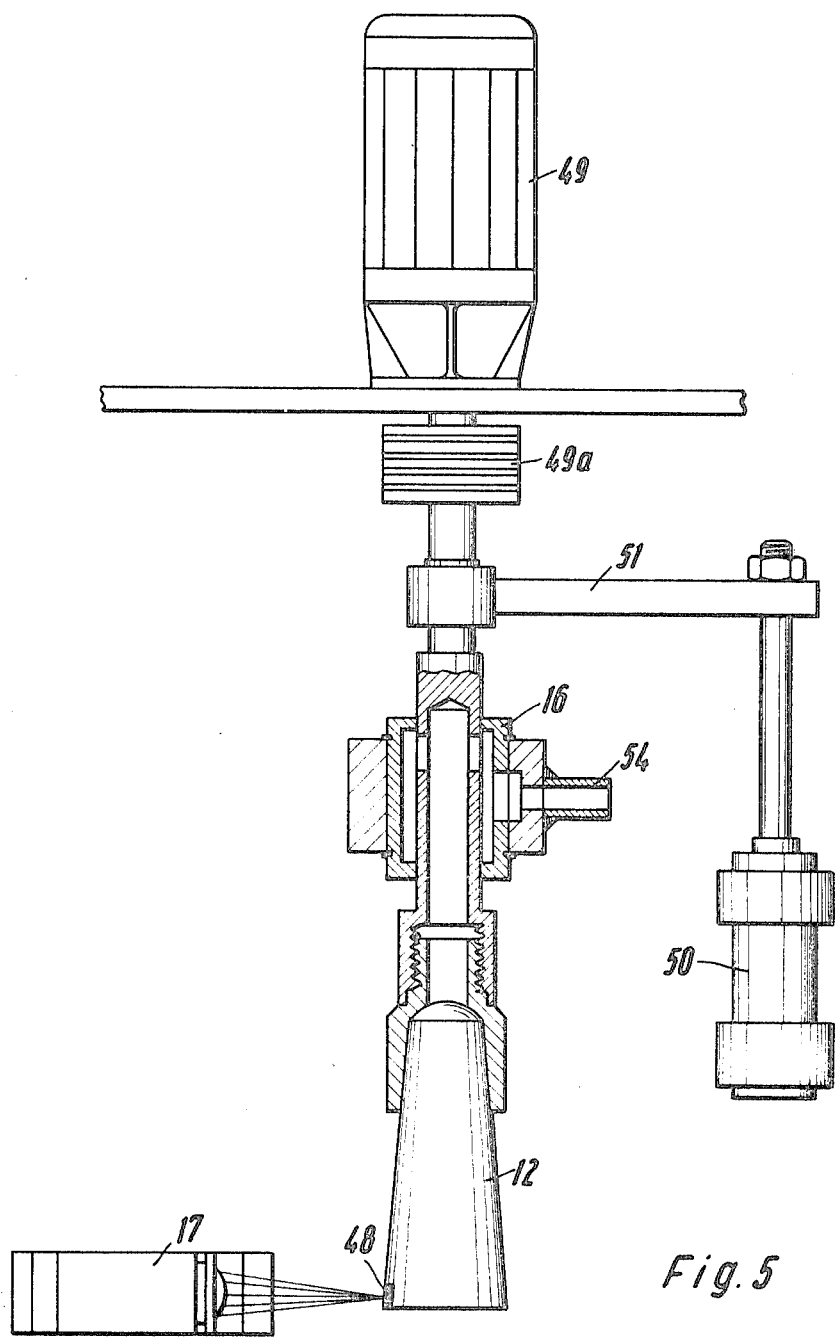
FIG. 5 shows on an enlarged scale details of an apparatus shown on a reduced scale in FIGS. 1 and 2 for the alignment of the seal relative to the bottle.

With the aid of a new apparatus arranged at the fourth cyclical point (operating station) each capsule can be rotated relative to the bottle (FIG. 5). For that purpose, the apparatus comprises a gripper 16 which expediently is designed as pneumatic gripper and a photoelectric cell system 17. The gripper, which is rotatable by means of a motor 49 is connected via a stud 54 to a pneumatic line not shown. By means of a pneumatic piston 50 connected via an arm 51 to the drive shaft of the motor the gripper can be raised and lowered. The seal is seized by the gripper, lifted and rotated around its longitudinal axis. The luminous ray of the photoelectric cell system controls a control mark 48 expediently located at the lower seal edge and disconnects the rotary movement once the control mark has been reached, by operating a magnetic brake coupling located between the motor 49 and the gripper 16. A short blast of air moves the aligned seal from the gripper back to the bottle. This alignment operation accomplishes that a window in the seal exposes the loop of the wiring of the champagne bottle and the caption or the coat of arms on the jacket of the seal is placed precisely between two outwardly oriented creases during the subsequent folding of the seal.

Figure 6:
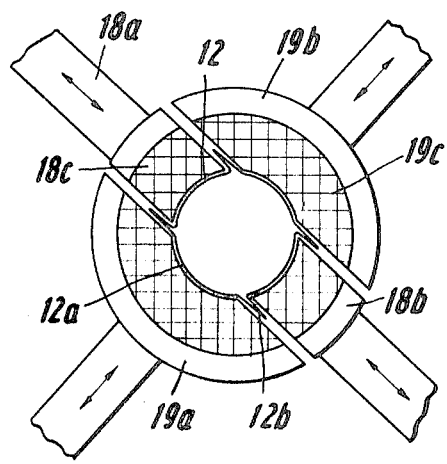
FIG. 6 shows in a schematic view from the top the tools used in the machine according to FIG. 1 for pre-folding the seal.

At the fifth cyclical point each seal placed on the bottle and aligned at the fourth cycle relative to the bottle is pre-folded. A pre-folding tool 18, 19 equipped with two pairs of dies 18a, b and 19a, b which are identical between them (FIG. 6) is used for the pre-folding operation. The dies of the pre-folding tools are lined with an elastic material 18c, 19c. Before the line dies adhere against the seal jacket 12 a head die 20 (FIG. 1) moves downward and adheres against the bottom of the seal. It is pressed upon the cork, whereby the seal is secured against twisting. After the head die 20 has been pressed against the seal bottom, the dies 18a, 18b, 19a, 19b of the pre-folding tools so press the seal against the bottleneck that the side with the picture or writing 12a of the seal jacket 12 will be placed creaseless on the bottleneck. Narrow folds 12b extending to the side of the picture or the writing from the top downward and protruding outwardly are created thereby.

At the sixth point of operation of the machine, according to FIG. 1, there is the apparatus schematically represented in FIG. 7 for the finish-folding of the seals. The apparatus coacts with a head die 22 which completely corresponds to the head die 20. The finish-folding tool comprises primarily two narrow adherence jaws 23a, b and two pairs of broad fold adherence jaws 24a, b and 25a, b. Two parts 32a, b of elastic material, for example rubber, are vulcanized to the inner surfaces of all jaws, having each two incisions 32c and/or 32d. The adherence jaws 23a, b each are connected to a pressure bar 40a, b. The pressure bars extend into cylindrical bores of outer pressure bars 27a, b. They in turn are guided longitudinally movably in cylindrical bores located in pressure dies 28a, b, pressure springs 39a, b and/or 29a, b, which engage the frontal surfaces of the pressure bars 40a, b and/or the outer pressure bars 27a, b, are placed inside the bores. Compressor means 30a, b adhere against nipples 33a, b and 34a, b applied to the fold adherence jaws. The fold adherence jaws are designed as two-armed levers with pivoting points 35a, b and 36a, b. The outer, opposite lever arms 37a, 38a and 37b, 38b are interconnected via traction springs 31a, b.

Before the apparatus 21 for the finish-folding of the seals goes into action, the seal is first secured against turning by pressing the head die 22 on the bottom of the seal. Then the movements of the pressure die 28a, b are started. The movements taking place in the direction of the horizontal arrows shown in FIG. 7 are transmitted via both pressure bars 27a, b and 40a, b to the adherence jaws 23a, b. The adherence jaws press the rubber parts 32a, b inwardly against the seal jacket. The rubber parts pressed inwardly by the adherence jaws adhere between the creases produced by the pre-creasing tool against the seal jacket, whereby the pictorial or writing side of the advertising on the seal jacket is covered for protection.

Trailing in relation to the compression jaws, the compression means 30a, b are moved in the direction of the arrows shown in FIG. 7 in vertical direction. The levers of the adherence jaws 24, 25 rotate around the pivoting points 35, 36. The rubber parts seized by the wide adherence jaws fold the creases still protruding and firmly press them against the surface parts of the seal jacket not in contact with the adherence jaws.

The pressure bars 27a, b and 40a, b are guided telescope-like in their perforations, whereby the springs 29a, b and 39a, b act as attenuating members and at the same time it is their taks to compensate tolerances in the dimensions of the bottles. Corresponding tasks are fulfilled by the traction springs 31a, b which interconnect the levers 37a, 38a and 37b, 38b placed opposite each other.

The operation of the parts in the pre-folding mechanisms and in the finish-folding tool which are movable back and forth, such as head die, pressure bars, compression means, etc., is accomplished by conventional angular levers, preferably by a joint compressed air cylinder in each case. The course of the movements is controlled synchronously with the bottle conveyance by roller chains 4. By interposing gear members of prior art a desired delayed action the movement of two parts (for example 28a, b and 30a, b) can be accomplished.

FIGS. 8 to 12 show another embodiment of the apparatus according to the invention, operating according to a variant of the method derived from the invention. In contrast with the apparatus described above, no control station is necessary here for determining whether a seal was placed on. Glue is applied here to the inner surface of the seal and not to the bottleneck. Parts which are identical with those already described above are provided in the following text with the same reference figures.

Figure 8:
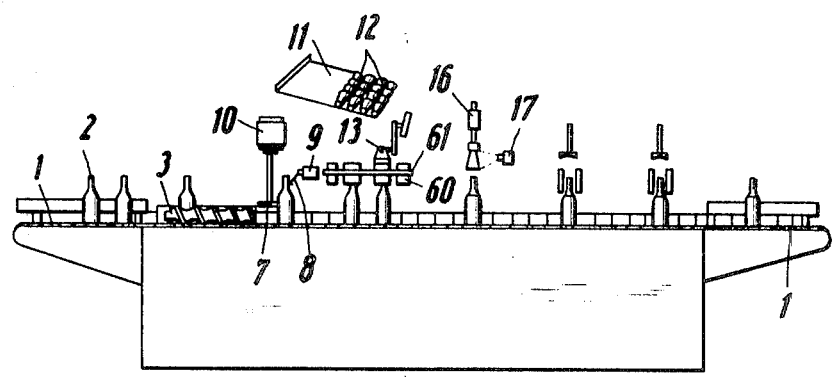
FIG. 8 shows a greatly simplified lateral view of another embodiment of the sealing machine according to the invention, the application of the glue taking place on the inside of the seal.
Figure 9:
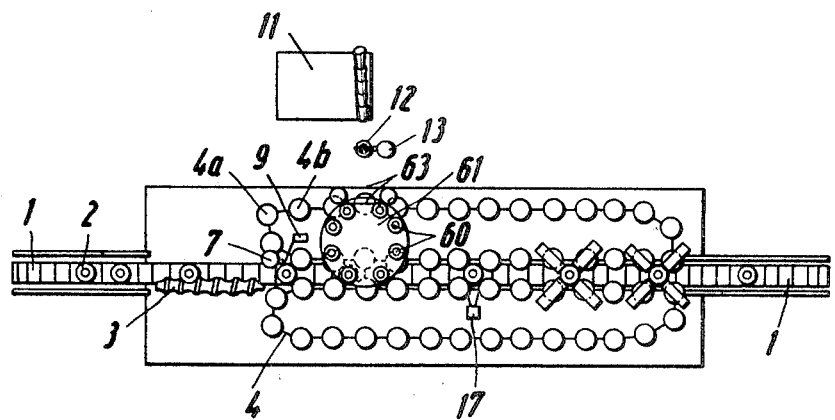
FIG. 9 shows a likewise greatly simplified plan view upon the machine according to FIG. 7.

In the apparatus shown in FIGS. 8 and 9 the conveying, aligning and rotating of the bottles takes place analogously to the apparatus shown in FIG. 1. After the bottles are seized by means of the roller chains 4, the above described friction wheel 7 represents the first cyclical point where each bottle still is movable by rotation.

Figure 10:
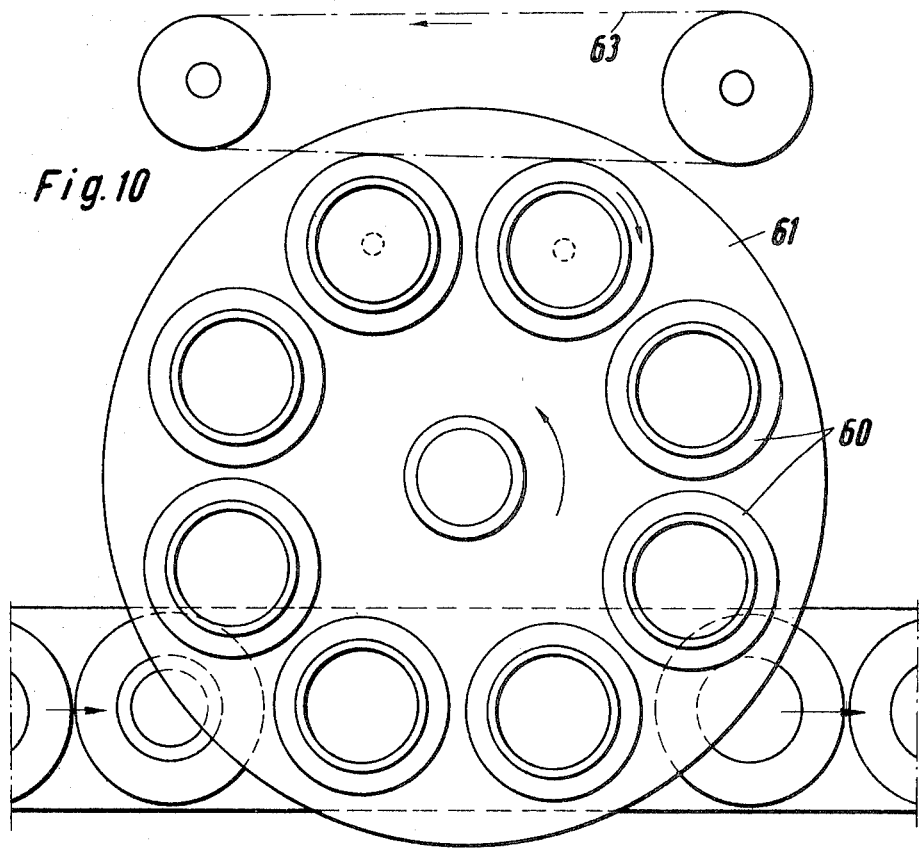
FIG. 10 shows on an enlarged scale details of the apparatus used according to FIG. 7 for glue-sizing and placing of the seal.

The second point of operation is formed by the seal glue-sizing and placement apparatus shown in detail in FIG. 10. In FIGS. 8 and 9 a seal feeding apparatus is shown in a very simplified manner, comprising a conveying gripper 13, a seal supply 11 and seals 12. These seals 12 are fed in each switching position to two rotatable bushings 60, positioned rotatably and freely in a switch plate 61. The seals 12 drop into the cylindrical accommodation bore of the bushings 60 and are held with their lower edge by the inwardly pivoted seal holders 62. The switch plate 61 switches synchronously with the movement of the bottle conveyor chain by the angular quantity assigned to the two bushings 60, in this case by 90°. The switch plate is in direct geared connection with the drive chain wheels of the roller chains 4.

Two rotatable bushings 60 are in contact in each case with a friction belt drive 63 continuously driven by means of an electric motor, said drive propelling the bushings. In this position a glue spray tube 64 (FIG. 11) is inserted from the bottom into both bushings along with the seal 12 located therein, said spray tube carrying a glue spray nozzle 65 on the side. From this nozzle 65 glue is sprayed laterally upon the inner wall means of the seal 12; the seal 12 rotating along with the bushing, the glue forms an annular surface 66 on the inner wall of the seal. Prior to further switching the glue spray tube 64 again is moved outwardly and downwardly. The guide and drive for the movement of the glue tube is omitted for simplicity's sake. The control is in function of the movement of the switching plate 61.

Figures 11, 12:
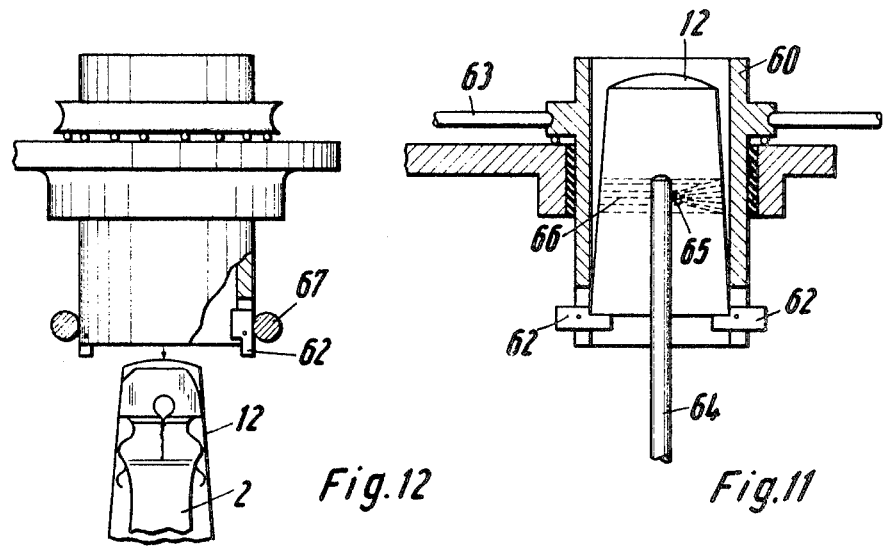
FIG. 11 shows a section through a bushing of the apparatus according to FIG. 9 during the glue-sizing of the seal.
FIG. 12 shows a lateral view of a bushing of the apparatus according to FIG. 9 immediately after a seal has been thrown on the bottle head.

Two already glue-sized seals 12 are placed in a position opposite the glue-sizing station in their bushings 60 above two bottles 2 in each case which are held firmly by the bottle conveying chains. In this position the ends of the seal holders 62 protruding outwardly, said seal holders being designed as two-armed levers, are pivoted by a ring 67 moved from the bottom up. This movement of the ring 67 is likewise accomplised (preferably by means of a compressed air cylinder) synchronously with the switch plate movement so that the rings 67 execute their movement during the rest position of the switch plate 61. The seal holders 62 consequently pivot out of the orbit of the seal 12 and release the seal 12 which drops on the head of the bottle 2 placed thereunder (FIG. 12).

In the embodiment shown the synchronous course of the switch plate 61 with the bottle conveyor chains is so selected that a shifting by the graduation of two bushings takes place in each case on the switch plate; however, according to the invention, it is also possible and advantageous for the installation to shift in each case only by one or even by several bushing graduations. The switching pace shown in the embodiment proved to be advantageous, for example, because due to the simultaneous handling of two seals in the gluing station sufficient time is available for a complete glue-sizing, that is the feeding speed of the bottle conveyor chains is not limited by the time used for the application of the glue.

Like in the apparatus shown in FIG. 1, the following operating station compriess a gripper 16, for example a pneumatic gripper, and a photoelectric cell system 17. The seal 12 is seized by the gripper 16, lifted again and rotated around its longitudinal axis. The luminous ray of the photoelectric cell system scans a control mark at the lower seal edge and disconnects the rotary movement, as soon as the control mark has been reached. In this position, the seal 12 is again deposited at the bottle 2. The alignment process accomplishes that a window in the seal exposes the loop of the wiring of the champagne cork and an impression on the seal jacket is placed precisely between two outwardly oriented creases during the following pre-folding of the seal 12.

In the following cyclical positions the seal 2 placed and aligned on the bottle is pre-folded in the above-described manner and finally it is finish-folded. Creases extending from the top downward of narrow shape and thereby produced to the side of the impression on the seal, which are provided with glue on their inside, so that they stick together and better stiffen the seal.

The second variant shown (FIGS. 8 to 12) of the method and apparatus according to the invention is characterized by the fact that control systems may be dispensed with which are to determine whether actually a seal has been applied to the bottle. If actually during the second variant in one instance no seal has been applied, there is no danger for the subsequent folding tools or the seal lift mechanism to become contaminated and sticky by glue at the bottleneck, because according to this metod the bottleneck carries no glue, because only the inner area of the seal itself is glue-sized. For example, it also is assured that a bottle can pass through the machine unimpededly without a seal and it is rejected at the end of the machine at the control taking place there. In this case the machine need not be stopped either.

I claim:

1. A method for the application and fastening of prefabricated seals or crowns in a continuous operation on bottles which have been filled, corked and wired comprising the steps of positioning the bottle on a conveyor for movement of the bottle, applying an adhesive to the bottle in a narrow area below the mouth of the bottle, rotating the bottle about its axis until a desired position is reached for orientation of the bottle for subsequent steps, gripping the bottle to prevent rotation for subsequent operations, positioning a seal over the mouth of the bottle, scanning the bottle to ascertain whether a seal has been applied, rotating the seal relative to the bottle to a position for subsequent folding onto the bottle, prefolding the seal in the desired position on the bottle and finally pressing the prefolded seal onto the neck of the bottle for final folding.

2. An apparatus for the application of prefabricated seals onto filled, corked and wired bottles comprising a conveyor on which the bottle is carried to the various operating stations, a pre-sorting worm gear for rotating the bottle and means for application of the adhesive to the neck of the bottle during such rotational movement, a photo electric cell which terminates rotation of the bottle in response to detection of a point on the bottle for alignment for subsequent operations, means for feeding a seal and inserting the seal over the neck of the bottle while being held against rotational movement, scanning means for determining the presence of a seal on the bottle, means responsive to said scanning, means for discontinuing operation in the event that such scanning means fail to detect a seal on the bottle, operation means engaging the seal on the neck of the bottle for rotation of the seal relative to the bottle for proper alignment and a scanning means for inactivating said rotating means upon proper alignment of the seal, means adapted operatively to engage the aligned seal on the bottle to prefold the seal, and other means adapted operatively to engage the seal to press the seal onto the neck of the bottle in a final folding operation.

3. A method for the application and fastening of prefabricated seals onto filled and corked bottles, comprising advancing said bottles on a conveyor belt for a continuous operation, rotating the bottle about its axis to an aligned position for application of a seal, gripping the aligned bottle to prevent rotational movement, applying a band of adhesive to an interior surface of the seal, applying the seal loosely onto the neck of the bottle, rotating the seal relative to the bottle to a desired position for alignment for subsequent folding, pressing the aligned seal against the neck of the bottle in a first prefolding operation and then in a final folding operation.

4. An apparatus as claimed in claim 2 in which the apparatus for rotating the bottles located in the area of the pre-sorting worm gear is a belt extending parallel to the worm gear level with the foot of the bottle equipped with a friction coat.

5. An apparatus as claimed in claim 2 in which the apparatus for applying the adhesive to the upper bottleneck is a belt to which adhesive adheres.

6. An apparatus as claimed in claim 2 in which the holding means for the bottles consist of two endless roller chains extending laterally of the conveyor belt, of which two rollers each convey the bottles rhythmically to the operating stations corresponding to the individual operating stations.

7. An apparatus as claimed in claim 2 in which the apparatus for the scanning of the seals is coupled with a switching means which upon the absence of a seal in each case disconnects the subsequent alignment and seal-folding operations.

8. An apparatus as claimed in claim 2 in which the alignment means for the seals is a gripper lifting and rotating the seals, whereby the rotary movement is controllable via a photoelectric cell for a certain alignment of the seal.

9. An apparatus as claimed in claim 2 in which the apparatus for pre-folding the seals consists of two pairs of dies identical among themselves and lined with elastic material.

10. An apparatus as claimed in claim 2 in which the apparatus for the finish-folding of the seals consists of a pair of narrow press-on jaws and two pairs of wide fold-application jaws, a rubber ring of two parts being placed between the jaws of the pairs and the seal.

11. An apparatus as claimed in claim 10 in which the press-on jaw is connected on one side with one pressure lever each, the press-on jaws being located in the area of two press-on means and springs being provided to attenuate the movements executable by the jaws.

12. An apparatus as claimed in claim 2 characterized by one head die each to hold down the seals in coaction with the pre-fold and finish-fold tools.

13. A method according to claim 3, whereby the application of glue is accomplished by spraying an annular strip of glue to the inner jacket area of the readied seal.

References Cited
FOREIGN PATENTS

| | | | |
|---|---|---|---|
| 1,442,010 | 5/1966 | France | 53—128 |
| 1,969,939 | 5/1967 | Germany | 53—128 |

TRAVIS S. McGEHEE, Primary Examiner

N. ABRAMS, Assistant Examiner

U.S. Cl. X.R.

29—208 B; 53—128, 291, 345, 367